United States Patent [19]

Kobayashi et al.

[11] 4,061,567

[45] Dec. 6, 1977

[54] METHOD FOR ADSORPTION OF OILS

[75] Inventors: Yoshinari Kobayashi, Kagawa; Ryukichi Matuo, Takamatsu; Masashi Nishiyama, Kanonji, all of Japan

[73] Assignee: Agency of Industrial Science & Technology, Tokyo, Japan

[21] Appl. No.: 771,258

[22] Filed: Feb. 23, 1977

[30] Foreign Application Priority Data

Mar. 1, 1976 Japan .................................. 51-22450

[51] Int. Cl.² .............................................. C02B 9/02
[52] U.S. Cl. .............................. 210/40; 210/DIG. 26
[58] Field of Search .................... 210/40, 36, DIG. 26

[56] References Cited

U.S. PATENT DOCUMENTS

| | | | |
|---|---|---|---|
| 3,536,615 | 10/1970 | Bunn | 210/40 |
| 3,607,741 | 9/1971 | Sohnius | 210/40 |
| 3,617,556 | 11/1971 | Cole et al. | 210/40 |

Primary Examiner—Thomas G. Wyse
Attorney, Agent, or Firm—Oblon, Fisher, Spivak, McClelland & Maier

[57] ABSTRACT

Kapok fibers enjoy a low specific gravity, water repellency and a high oil-adsorbing capacity. When they are used as an adsorbent of oils and brought into contact with oils floating on or suspended in water, they provide effective adsorption of the oils.

5 Claims, No Drawings

METHOD FOR ADSORPTION OF OILS

BACKGROUND OF THE INVENTION

The present invention relates to a method for adsorption of oils floating on or suspended in water.

Because of the worldwide expansion of oil consumption, the seas are congested with oil-tankers carrying crude-oil. As a result, the possibility of contamination of water surfaces in harbors and even on the open seas by oils leaking from oil-tankers has been greatly increased. In addition, there is an increasing possibility that the industrial effluents from chemical plants and other plants using petroleum as the raw material will entrain various forms of oils and pollute nearby bodies of water. Furthermore, the growth of automobiles and expressways has reached the point where oils spilling from automobiles onto road surfaces are washed out by rainwater and carried off through sewage systems to pollute culverts, ditches, rivers and seas. Consequently, there has risen a necessity for means for efficiently removing oils floating on or suspended in waters of all sorts.

For this purpose, there have been proposed various kinds of oil-adsorbing materials. The oil-adsorbing materials available heretofore are broadly divided into two classes, one class using synthetic high-molecular substances and the other class using natural fibers. Falling in the former class are those using polypropylene, polystyrene, polyurethane foam, etc. Those of the latter class use pulp fibers, coconut shell fibers, cotton fibers, peat fibers and straw.

Of the oil-adsorbing materials heretofore known to the art, those made of synthetic high-molecular substances generally have a fundamental defect that they lack in resistance to oils. They have another disadvantage that the materials, when disposed of by incineration in conjunction with adsorbed oils, give rise to molten polymers which will do damage to incinerators and issue noxious gases. In addition, the oil-adsorbing materials made of synthetic high-molecular substances have a fatal drawback that they fail to exhibit any adsorbing activity on the so-called chocolate mousse which is formed when the waste oil, rolled and pitched on waves, forms balls in consequence of the emulsification caused thereon by a small proportion of entrapped sea water. The oil-adsorbing materials made of synthetic high-molecular substances also have the disadvantage that they themselves may cause serious ecological problems if not thorough recovered after use on seas or oceans.

In contrast the oil-adsorbing materials using natural fibers have a disadvantage that, because of their high hydrophilicity, they exhibit a high water-adsorbing capacity. To be freed from this disadvantage, these materials must undergo a preliminary treatment designed to impart water repellency or waterproofness thereto. Owing to their generally high levels of specific gravity, they fail to remain afloat on water and tend to sink under water. They also suffer from the disadvantage that they have rather limited capacities for adsorbing and retaining oils.

An object of the present invention is to provide a method for the adsorption of oils, which method enables oils including chocolate mousses floating on or suspended in water to be effectively adsorbed.

Another object of this invention is to provide a method for the adsorption of oils, which method permits required adsorption of oils with an extremely high efficiency.

SUMMARY OF THE INVENTION

To attain the objects described above, the method for the adsorption of oils according to the present invention uses kapok fibers as the oil-adsorbing material which is brought into contact with oils floating on or suspended in water. The kapok fibers have a specific gravity of only 0.04 to 0.05 and repel water and, hence, enjoy high floatability in water. They also abound in an oil-adsorbing capacity. The fibers, therefore, provide effective adsorption of oils which is floating on water or suspended in water.

The term "oils" as used in this specification means all the oils including machine oils, edible oils, heavy oils and crude oils.

The other objects and characteristic features of this invention will become apparent from the description of invention to be given in detail hereinafter.

DESCRIPTION OF THE PREFERRED EMBODIMENTS

After various studies made concerning oil-adsorbing materials, the inventors arrived at the discovery that kapok fibers, as the basic material for an oil adsorbent, are free from the various disadvantages attendant upon the conventional oil adsorbents, exhibit an extremely high coefficient of oil adsorption and prove highly advantageous for the purpose of oil adsorption.

Kapok fibers are silky fibers that clothe the seeds of the ceiba tree of the family Bombacaseae and have a length of about 10 to 30 mm and a diameter of about 15 to 45 $\mu$. Kapok seeds are valued highly because they produce kapok oil. In contrast, kapok fibers have rich oiliness and do not have high strength and, therefore, cannot be spun economically. The uses heretofore found for the kapok fibers, accordingly, have been limited to packing materials such as in life jackets, cushions, matresses and pillows and to heat-insulating materials such as in space cooling and warming devices.

Kapok fibers vary to some extent in properties depending on their species. Typical analyses indicate that they are composed of about 64% of cellulose, 13% of lignin and 23% of pentosan. Besides the principal constituents just mentioned, they contain waxy cutin. Some advocate a theory that the waxy cutin intermingles with cellulose and consequently constitutes a non-hygroscopic cutocellulose. In any event, the kapok fibers possess water repellency notwithstanding the fact that they are natural fibers composed preponderantly of cellulose. Moreover, the individual fibers constitute themselves independent cells which have a thin cell wall and a thick lumen containing gaseous bubbles. By this reason, their specific gravity is extremely small. For example, the specific gravity is about 0.038 in the case of kapok fibers produced in Java and about 0.05 in the case of those produced in India. This means that they can float on water until their weight increases to 20 to 40 times the original value in consequence of adsorption of liquids. Since kapok fibers have a property of repelling water and exhibit a very small specific gravity, they can remain afloat on water surfaces for a long time.

Further, kapok fibers have a high capacity for adsorbing oils. The oil-adsorbing property of kapok fibers, although variable to a slight extent with the kind of oil involved, the temperature of water on which the oil is floating and the conditions of the fibers (such as size of fiber, surface area and bulkiness), is more than twice as high as that of the fibers, identical in size, of polypropylene which is one of the synthetic compounds that exhibit the highest level of oil-adsorbing capacity. Possession of such an outstanding capacity for oil adsorption as this is hard to imagine in naturally produced fibers.

What is more, kapok fibers excel the fibers of synthetic high-molecular compounds, particularly polyurethane and polypropylene, to some extent in hydrophilicity and therefore function advantageously upon and provide effective adsorption of the chocolate mousse which defies adsorption by synthetic high-molecular oil adsorbents. Unlike the fibers of synthetic high-molecular compounds, kapok fibers are not dissolved by the chocolate mousse.

When kapok fibers are used as the oil adsorbent in accordance with the present invention, the oil adsorbent has hydrophilicity such that it can be thrown in its unaltered form into water and it immediately begins to adsorb oils floating on or suspended in water. If these kapok fibers are such that their oleophilicity must be increased or their water-adsorbing property repressed, then they can be treated by any suitable known process designed to impart water repellency or waterproofness.

For actual use in the adsorption of oils floating on or suspended in water, the oil adsorbent is desired to be in a form selected from the class consisting of mat, bulk, belt, rattan, etc. to suit the particular conditions of the oils floating on or suspended in water. Since kapok fibers have insufficient spinnability, they may be wrapped in a net formed of suitable fibers, processed by the wet non-woven fabric production technique so as to be finished in the form of non-woven fabrics or mixed with synthetic fibers or natural fibers such as, for example, polypropylene fibers, peat fibers, cotton or help fibers so as to be finished in the form of mat or belt, with due consideration paid to the suitability of their finished form to the condition in which oils are floating on or suspended in water.

Since kapok fibers are natural fibers which are composed chiefly of cellulose, lignin and pentosan, the oil adsorbent of the present invention which has served the purpose of oil adsorption and has been recovered from the water can be disposed of by incineration without entailing any difficulty such as is involved in the case of synthetic fibers. Even if the oil adsorbent used on a sea or ocean should escape thorough recovery after use, there is no possibility that the residual oil adsorbent will give rise to any problem concerning the ecosystem because the adsorbent is made up of natural high polymers capable of spontaneous decomposition. The recovered oil adsorbent can be put to re-use after it has been centrifuged or otherwise suitably treated so as to be freed from the adsorbed oil. The centrifugation or other similar treatment will not degrade the oil adsorbent in its oil adsorbing capacity at all.

The method for the adsorption of oils according to the present invention uses, as the oil adsorbent, the kapok fibers which are by-produced in the extraction of kapok oil from the seeds of a plant cultivated widely in tropical countries. The kapok fibers are therefore quite inexpensive and readily available as an unexploited resource. The oil adsorbent exhibits an outstanding oil-adsorbing capacity and, after adsorption of oils, can very easily be disposed of. Thus, the present invention can be practiced advantageously from the commercial point of view.

An oil fence or oil fiber which utilizes to advantage the oil-adsorbing property of kapok fibers may also be produced such as by mixing kapok fibers with some other fibers and suitably shaping the resultant mixed fibers.

Now the present invention will be described more specifically with reference to working examples, which are cited solely for illustration and are not limitative of the invention in any sense.

EXAMPLE 1

Wads, 1 g each, of kapok fibers (commercially ranked as B or C grade, produced in Java, Indonesia, aged about 2 years from the time of harvest) were submerged at 20° C for 30 minutes, one each in heavy oil of Grade B (flash point over 60° C, kinematic viscosity 50 cst at 50° C and pour point below 10° C) and machine oil (flash point over 160° C, kinematic viscosity 35–45 cst at 50° C and pour point below 10° C). At the end of the stated period, the wads of kapok fibers which had adsorbed the oils were taken out, left to stand on a 20-mesh metal gauge so as to allow the oils adhering to the fiber surfaces to drip off under force of gravity and then weighed. Thereafter, the wads of fibers were centrifuged at 3000 rpm for ten minutes to be freed of oils and again weighed. The amount of oil adsorbed was determined as the weight of oil per unit weight of the fibers according to the following formula:

$$\text{Amount of oil adsorbed} = (W - W')/W_0$$

wherein, $W_0$ stands for the weight of adsorbent prior to adsorption oil, W for the weight of adsorbent after removal of adsorbed oil dripping and W' for the weight of adsorbent after centrifugation. For comparison, 2 deniers polypropylene fibers 6 mm in length and a piece 50 mm × 50 mm cut from a commercially available polypropylene mat 5 mm in thickness were subjected to the same treatment, followed by determination of the amount of oil adsorbed.

The results are shown in Table 1.

Table 1

| Amount of oil adsorbed | Adsorbent Kapok fibers (g) | Comparison Polypropylene fiber (g) | Polypropylene mat (g) |
| --- | --- | --- | --- |
| Heavy oil, Grade B | 59.7 | 27.5 | 9.8 |
| Machine oil | 73.6 | 27.7 | 10.3 |

It is seen from the table that the amount of oil adsorbed by kapok fibers according to the present invention is more than twice as large as that obtainable by polypropylene which has heretofore been considered as excelling in oil-adsorbing property.

EXAMPLE 2

At 20° C, heavy oil of Grade B and machine oil, both the same as those used in Example 1, were added respectively to water in an amount of 1% by weight and a surface active agent "NOIGEN (a proprietary product of Dai-Ichi Kogyo Seiyaku K.K. of Japan)" was added each in an amount of 0.05% by weight. The resultant mixtures were vigorously agitated to form oil emulsions in water. Wads, 1 g each, of kapok fibers produced in Java origin were submerged in the emulsions. After the submersion, the oil-adsorbed wads of fibers were treated by the procedure of Example 1 to determine the amount of oil adsorbed. The water content was properly compensated. For comparison, the same polypropylene fibers and the same cut piece of polypropylene mat as used in Example 1 were similarly treated and then tested for the oil-adsorbing property. The results are shown in Table 2.

Table 2

| Amount of oil adsorbed | Adsorbent Kapok fibers (g) | Comparison | |
|---|---|---|---|
| | | Polypropylene fiber (g) | Polypropylene mat (g) |
| Heavy oil, Grade B | 33.0 | 1.7 | 11.1 |
| Machine oil | 35.3 | 4.3 | 7.8 |

EXAMPLE 3

At 20° C, heavy oil of Grade B and machine oil, both the same as those used in Example 1, were respectively added each in an amount of 20% to water. The mixtures were vigorously agitated to form oil layers containing a partly suspended water. Wads, 1 g each, of the same kapok fibers of Java origin as used in Example 1 were submerged and vigorously agitated for 5 minutes. Thereafter, the wads were treated by following the procedure of Example 1 to determine the amount of oil adsorbed. For comparison, the same polypropylene fibers and the same cut piece of polypropylene mat as used in Example 1 were similarly treated. The results are shown in Table 3.

Table 3

| Amount of oil adsorbed | Adsorbent Kapok fibers (g) | Comparison | |
|---|---|---|---|
| | | Polypropylene fiber (g) | Polypropylene mat (g) |
| Heavy oil, Grade B | 141.4 | not determined | not determined |
| Machine oil | 44.6 | 28.0 | 13.3 |

When the polypropylene fiber and polypropylene mat adsorbed B-heavy oil, they were swelled and then firmly adhered to the wire net. For this reason, the amount of oil adsorbed could not be determined. However, the kapok fiber effectively adsorbed the B-heavy oil without being dissolved thereby.

EXAMPLE 4

A bag of unbleached cotton cloth 50 cm × 50 cm in size was packed with 100 g of kapok fibers and quilted in the shape of a mat. The mat was thrown in heavy oil of Grade B. It adsorbed the oil to a total weight about 20 times the weight of the mat. Then, the mat was centrifuged at 3000 rpm for 10 minutes for removal of adsorbed oil. Consequently, the weight of the mat decreased to 1.5 times its own weight. When the centrifuged mat was again thrown in the heavy oil of Grade B, it adsorbed oil to a total weight about 20 times its own weight.

A mat was made by following the procedure described above, except a bag was formed of cloth of polyethylene fibers instead of cotton. When this mat was thrown in the heavy oil of Grade B, it adsorbed the oil to a total weight about 25 times the weight of the mat.

EXAMPLE 5

Mats made of mixed fibers consisting of 70% of kapok fibers and 30% of polypropylene fibers were thrown one each in heavy oil of Grade B and machine oil. The mats were treated by following the procedure of Example 1 to determine the amount of oil adsorbed. Consequently, the mats adsorbed 23.3 g of the heavy oil of Grade B and 28.7 g of the machine oil respectively.

What is claimed is:

1. A method for the adsorption of oils floating on or suspended in water comprising the step of bringing an oil adsorbing material consisting essentially of kapok fibers into contact with said oils.

2. The method according to claim 1, wherein the kapok fibers are shaped in the form of a mat.

3. The method according to claim 1, wherein the kapok fibers are shaped in the form of a mass.

4. The method according to claim 1, wherein the kapok fibers are shaped in the form of a belt.

5. The method according to claim 1, wherein the kapok fibers are shaped in the form of a curtain containing spaced cuts.

* * * * *